(12) United States Patent
Kilian et al.

(10) Patent No.: US 7,681,443 B2
(45) Date of Patent: *Mar. 23, 2010

(54) APPARATUS FOR DETECTING HUNTING AND ANGLE OF ATTACK OF A RAIL VEHICLE WHEELSET

(75) Inventors: Krzysztof Kilian, Colorado Springs, CO (US); Vladimir Mazur, Floreat (AU); Hilary Gration Ranwala, Landsdale (AU)

(73) Assignee: LynxRail Corporation, Colorado Springs, CO (US)

( * ) Notice: Subject to any disclaimer, the term of this patent is extended or adjusted under 35 U.S.C. 154(b) by 40 days.

This patent is subject to a terminal disclaimer.

(21) Appl. No.: 11/751,457

(22) Filed: May 21, 2007

(65) Prior Publication Data

US 2007/0268131 A1 Nov. 22, 2007

Related U.S. Application Data

(62) Division of application No. 11/182,695, filed on Jul. 15, 2005, now Pat. No. 7,278,305.

(60) Provisional application No. 60/588,910, filed on Jul. 16, 2004.

(51) Int. Cl.
*E01C 23/00* (2006.01)
*B60C 23/00* (2006.01)

(52) U.S. Cl. ........................................................ 73/146

(58) Field of Classification Search ......... 73/146–146.8
See application file for complete search history.

(56) References Cited

U.S. PATENT DOCUMENTS

| | | | |
|---|---|---|---|
| 2,590,603 A | 3/1952 | Gieskieng | |
| 3,992,935 A * | 11/1976 | Schubert | 73/146 |
| 4,417,466 A * | 11/1983 | Panetti | 73/105 |
| 4,866,642 A | 9/1989 | Obrig et al. | |
| 5,368,260 A | 11/1994 | Izbinsky et al. | |
| 5,493,499 A * | 2/1996 | Theurer et al. | 701/207 |
| 5,622,338 A | 4/1997 | Klink | |
| 5,740,992 A | 4/1998 | Vogt | |
| 6,377,215 B1 | 4/2002 | Halvorson et al. | |
| 6,381,521 B1 | 4/2002 | Dembosky et al. | |
| 6,405,141 B1 | 6/2002 | Carr et al. | |
| 6,415,208 B1 | 7/2002 | Pojda | |
| 6,516,668 B2 | 2/2003 | Havira et al. | |

(Continued)

FOREIGN PATENT DOCUMENTS

DE 72655 12/1893

(Continued)

*Primary Examiner*—Max Noori
(74) *Attorney, Agent, or Firm*—Lathrop & Clark LLP (57) ABSTRACT

An apparatus and method for estimating the angle of attack of wheels, wheelsets, trucks and railway vehicles traveling over a track employing a wayside system having a plurality of sensors, adjacent to the rails of the track, for detecting the passing of each wheelset of each truck. Each sensor communicates its moment of activation and length of activation caused by a passing wheel to a sensor monitoring unit for use in determining the angle of attack of the passing wheel, wheelset, truck and railway vehicle. The estimated angle of attack of the wheelset at different locations along the track may be used to detect a hunting wheelset, truck or railway vehicle.

3 Claims, 8 Drawing Sheets

U.S. PATENT DOCUMENTS

| | | |
|---|---|---|
| 6,675,077 B2 | 1/2004 | Dembosky et al. |
| 6,899,217 B1 | 5/2005 | Fortenbery et al. |
| 6,909,514 B2 * | 6/2005 | Nayebi .................. 356/601 |
| 6,951,132 B2 | 10/2005 | Davenport et al. |
| 2003/0078700 A1 | 4/2003 | Chee |
| 2004/0095585 A1 | 5/2004 | Nayebi |

FOREIGN PATENT DOCUMENTS

| | | |
|---|---|---|
| DE | 24 13 530 A1 | 10/1975 |
| DE | 102 25 071 A1 | 6/2002 |
| DE | 101 01 601 A1 | 8/2002 |
| EP | 1 614 602 A1 | 6/2005 |
| FR | 1 240 038 | 7/1960 |

* cited by examiner

APPARATUS FOR DETECTING HUNTING AND ANGLE OF ATTACK OF A RAIL VEHICLE WHEELSET

CROSS REFERENCE TO RELATED APPLICATIONS

This application is a divisional of U.S. patent application Ser. No. 11/182,695, filed Jul. 15, 2005 now U.S. Pat. No. 7,278,305, which claims priority from U.S. Provisional Application Ser. No. 60/588,910, filed Jul. 16, 2004, the disclosures of which are incorporated herein by reference in their entirety.

FIELD OF THE INVENTION

The present invention relates generally to an apparatus and method for measuring angle of attack of a wheelset and detecting wheelset, truck and rail vehicle hunting. More particularly, the present invention relates to a system and method for detecting hunting and measuring angle of attack of a wheelset of a rail car traveling on a rail employing sensors that detect the proximity of moving objects.

BACKGROUND OF THE INVENTION

Hunting is a condition in which a wheelset, truck or rail vehicle oscillates from side to side between rails of track while moving. Hunting may be caused by worn truck components, wear or defects in the track or rails or a variety of other reasons. Hunting results in rapid wear of truck and vehicle components, rails and other railway components, and has the potential to cause damage to cargo and perhaps eventually lead to derailment. The detection of hunting is important but relatively difficult. As such, a hunting condition may go undetected for a substantial period of time.

Angle of attack is generally defined as the yaw angle between wheels of a wheelset and rails. One measure of angle of attack is the angle between the plane of the wheel engaged on rail and a plane tangent to the rail. Angle of attack may also be shown by the angle between the axle centerline of a wheelset and a line that is either perpendicular to a rail or normal to the tangent of a rail. Angle of attack is a critical factor for assessing rail vehicle performance. For example, when the angle of attack is zero, the wheelset of a railway vehicle has equal magnitude and direction as the translational velocity of the railway vehicle resulting in greater efficiency of the railway vehicle. However, a positive angle of attack indicates a potential for a wheel set, truck or railway vehicle to climb the rails and even derail. Further, a positive angle of attack has the potential to generate transverse forces that may result in damage to railway and truck components and increase costs of maintenance and repair of such components.

Systems that detect hunting are currently available. For example, U.S. Pat. No. 5,622,338, the entirety of which is hereby expressly incorporated herein by reference, uses an acceleration sensor mounted to a truck for measuring acceleration of a rail car in a direction transverse to the rail. Such truck-mounted systems, however, are not suitable for use at a way station or a wayside, i.e., along the side or edge of a railroad track. Further, such truck-mounted systems are unsuitable for detecting hunting of individual wheels or wheelsets or measuring angle of attack of wheels, wheelsets, trucks or railway vehicles.

Systems are also currently available for measuring angle of attack. For example, angle of attack has been measured with a vehicle-mounted system associated with a particular wheelset as the rail vehicle travels on a track. Such vehicle-mounted systems are typically mounted to a particular wheelset, and therefore, are unsuitable for way station or wayside use or for determining angle of attack for all wheelsets on a railway vehicle. Further, because such systems are located on the vehicles themselves, the systems are less reliable and require more maintenance and supervision than a system suitable for way station or wayside use.

In addition, angle of attack has also been detected with a wayside mounted system. For example, U.S. Pat. No. 5,368,260, the entirety of which is hereby expressly incorporated by reference, uses a wayside rangefinder that incorporates a laser beam directed at a wheel to measure angle of attack between a plane of the wheel and a tangent of the track. The known wayside systems and methods for measuring angle of attack, however, are spaced substantially from the track and result in a static measurement which does not take into account dynamic misalignment of the rails due to train forces, environmental forces such as moisture and temperature changes, or misalignment of the wayside measuring systems due to the same or similar environmental forces. In addition, such systems are located to one side of the track making it unsuitable for directly detecting the angle of attack of wheels on the far rail. Further, laser beam systems are expensive, require continued maintenance and supervision and are prone to misalignment and malfunction due to the often treacherous railway environment and other moving objects associated with the environment.

Systems located adjacent to the rails of a railroad that measure angle of attack are also currently available. For example, U.S. Pat. No. 6,381,521, the entirety of which is hereby expressly incorporated by reference, discloses a method for determining angle of attack using vertical, lateral and angle of attack strain gages placed onto rails. Such systems, however, involve multiple types of gages to detect a number of forces and strain and require expensive and time consuming changes to track infrastructure or supplementation by other devices. For example, installation of strain gages on a rail typically requires grinding the rail and installing concrete rail sleepers. Further, as rail sections are changed out, the potential loss of strain gages makes strain gage technology impractical.

Further, known strain gage systems require precise location and installation of the gages, a time consuming and tedious process. For example, strain gages must be precisely located on a rail and often cannot be placed over a tieplate or sleeper as rail flexure needed to measure strain occurs between the sleepers. Moreover, the accuracy of strain gages may be compromised by temperature, material properties, the adhesive that bonds the gages to a rail, and the stability of the railway metal. For example, many strain gage materials are sensitive to changes in temperature and tend to drift and change resistance as they age. Further, calculating angle of attack based significantly on measurements of strain requires complex calculations.

Thus, there is a long felt need for an apparatus and method for both measuring angle of attack and detecting hunting of individual wheel sets as well as trucks and rail vehicles. In addition, there is a need for such an apparatus and method that is less susceptible to misalignment and poor signal quality due to external forces of the hazardous railway environment. Further, there is a need for such an apparatus and method that is inexpensive, easy to install, use and maintain, yet accurate in measuring angle of attack and detecting hunting.

SUMMARY OF THE INVENTION

The following disclosure describes an apparatus and method for measuring angle of attack of individual wheels and wheelsets, as well as trucks and rail vehicles, that is accurate, rugged, and easy to install and maintain. It is thus one aspect of the present invention to provide an apparatus and method for both measuring angle of attack and detecting hunting of individual wheels on each rail as well as wheelsets, trucks and railway vehicles. It is a further aspect of the present invention to provide a rail mounted system to allow measurement of angle of attack and detection of hunting for all wheels and wheelsets of a railway vehicle. In one embodiment, the invention employs sensors to determine both angle of attack and lateral position of each wheelset to detect hunting of a wheelset, truck or railway vehicle. More specifically, in one embodiment, the apparatus comprises multiple pairs of sensors, a first sensor of each pair interconnected to a first rail and a second sensor of each pair interconnected to a second rail, to estimate the angle of attack of each wheel of each wheelset at various points along each rail and to compare the angle of attack at those various points to determine whether any wheelset, truck or railway vehicle is hunting.

It is a further aspect of the present invention to provide a rail mounted system that dynamically measures angle of attack and detects hunting to compensate for any misalignment of a system due to train-related or environmental forces. In one embodiment, the sensors are adapted for interconnection to rails such that the sensors will move with the rails as they move to adjust for any dynamic misalignment of one or both rails due to various environmental and train forces. It is a further aspect of the present invention to employ supplemental instruments and devices to compensate for differential rail movement due to environmental and mechanical forces. For example, in one embodiment, the present invention employs an instrument for compensating, adjusting or measuring any differential movement resulting from differential temperatures and mechanical forces relative to each rail.

It is a further aspect of the present invention to use sensors that do not require significant changes to a railway during installation and are rugged and easy to maintain. It is thus one aspect of the present invention to utilize sensors that are suitable for installation on any track at practically any location along the rails of the track. Further, in one embodiment, the present invention does not require significant changes to rail infrastructure or supplementation by other devices. More specifically, in one embodiment, the present invention employs sensors adjacent to the rails.

It is a further aspect of the present invention to use sensors the accuracy and dependability of which is not significantly compromised by extreme conditions such as mechanical forces, temperature, material properties, adhesives needed to bond the sensors to a surface or the stability of the rail metal. It is a further aspect of the present invention to employ a high signal to noise ratio to obtain accurate measurements even as the condition of a track or railway environment deteriorates. More specifically, a number of different types of sensors for detecting the passing of a moving object with physical contact may be employed in connection with the present invention including, without limitation, a variety of proximity sensors, displacement sensors, optical sensors, position sensors, capacitive sensors, inductive sensors, ultrasonic sensors, infrared sensors, acoustic sensors, photoelectric sensors, laser sensors, and Hall effect sensors.

It is an additional aspect of the present invention to calculate both angle of attack and lateral position of each wheel on multiple wheelsets to more accurately detect hunting. Further, in one embodiment of the present invention, basic reliable engineering principles are used to derive the angle of attack and the lateral position of each wheelset to determine hunting and tracking of each wheelset.

Thus, it is one aspect of the present invention to provide a detection system comprising a first sensor that detects proximity of a first wheel of a wheelset and is located adjacent a first rail of a railway; and a second sensor that detects proximity of a second wheel of the wheelset and is located adjacent a second rail of the railway; wherein the first sensor and the second sensor are not strain gages and are in operable communication with a sensor monitoring device.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated and constitute a part of the Specification, illustrate embodiments of the invention and together with the general description of the invention given above and the detailed description of the drawings given below, serve to explain the principles of these inventions.

To assist in the understanding of the present invention, the following list of components and associated numbering found in the drawings is provided herein:

2 - first sensor
4 - second sensor
6 - railway
8 - sensor monitoring unit
10 - power and signal cable
12 - central processing unit
14 - visual display unit
16 - first rail
18 - second rail
20 - imaginary line
22 - mounting bracket
24 - sleeper
26 - wheelset It should be understood that the drawings are not necessarily to scale. In certain instances, details that are not necessary for an understanding of the invention or render other details difficult to perceive may have been omitted. It should understood, of course, the invention is not necessarily limited to the particular embodiments illustrated herein.

DETAILED DESCRIPTION

Figure 1:
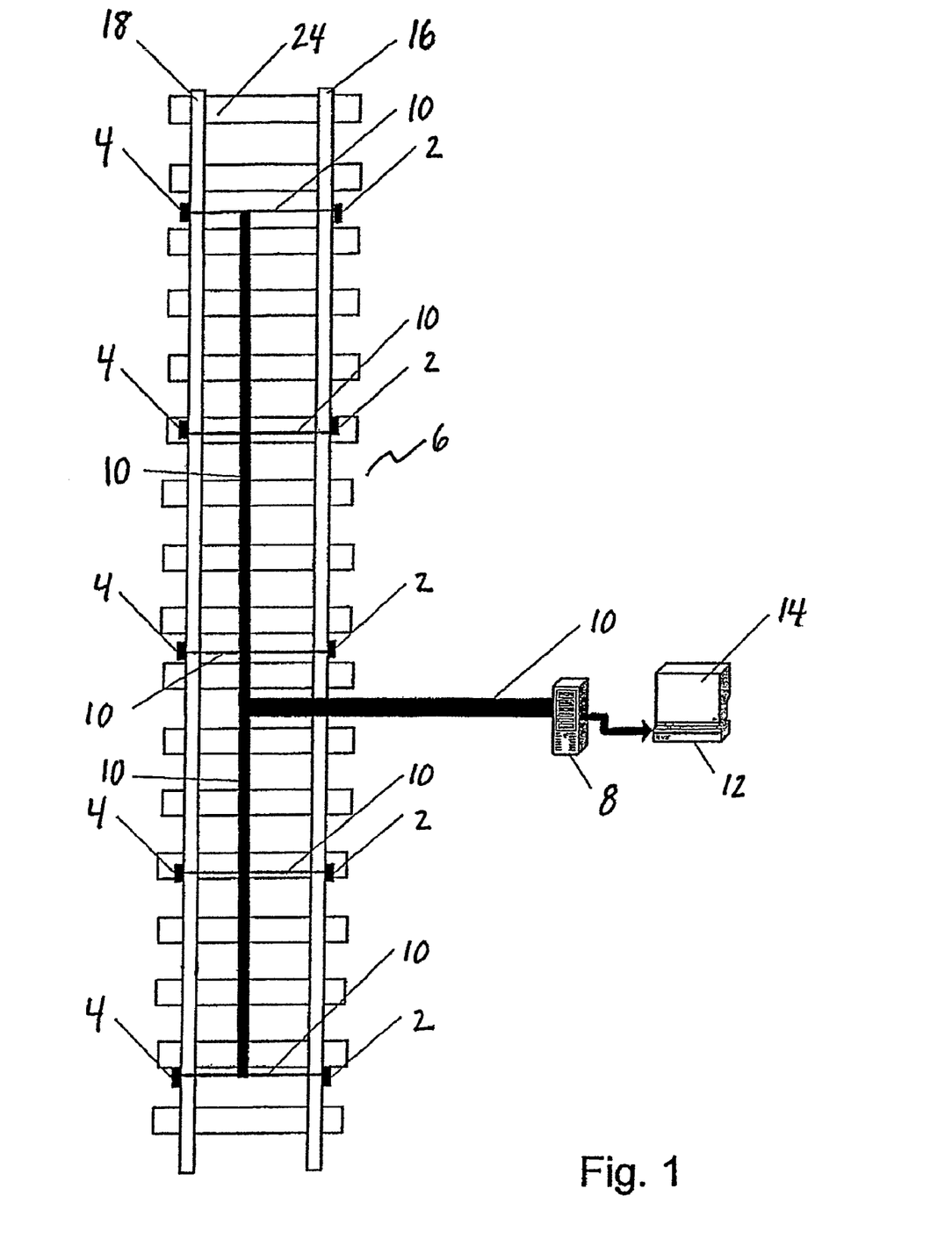
FIG. 1 is a schematic top plan representation of one embodiment of the present invention.
Figure 2:
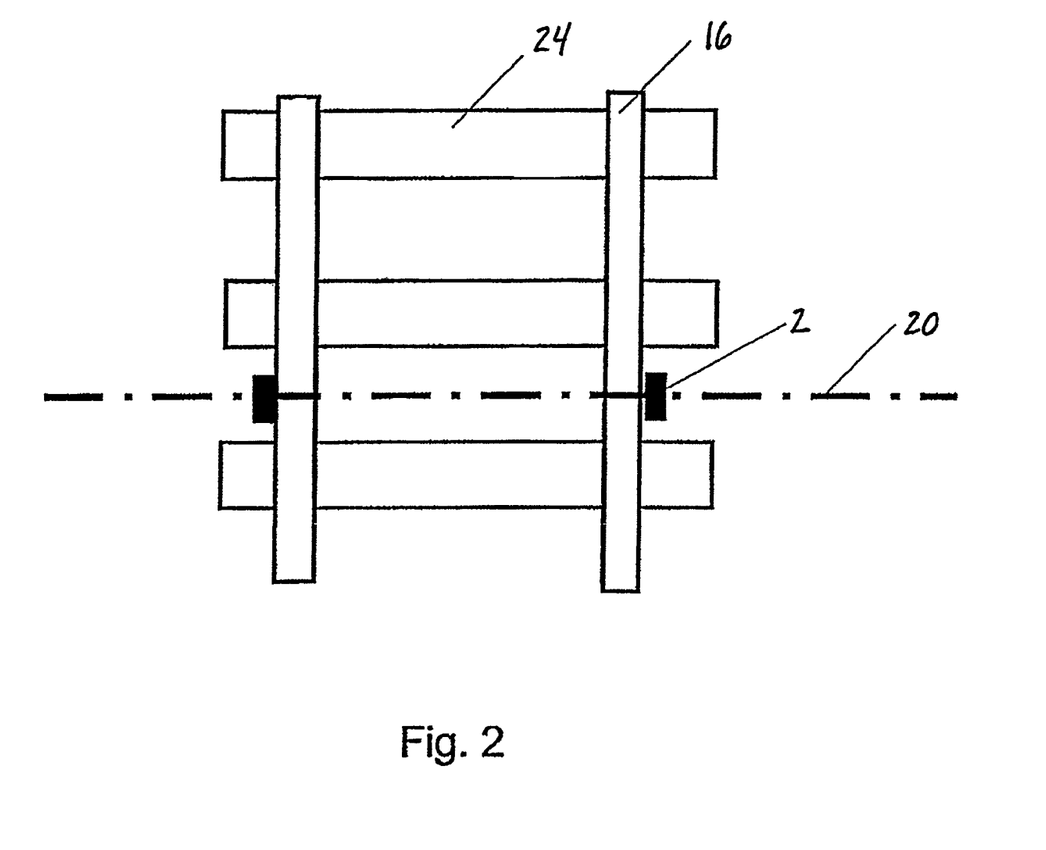
FIG. 2 is a top plan view of a pair of sensors connected to rails of a straight stretch of track and located on a line generally perpendicular to the longitudinal axis of a rail of track.

Referring now to FIG. 1, an overall apparatus schematic top plan view of one embodiment of the present invention is set forth. In one embodiment, at least one first sensor 2 and at least one second sensor 4 are positioned along a railway 6 and arranged in a manner that enables output of each first sensor 2 and each second sensor 4 to be communicated to, recorded, processed and/or displayed by a sensor monitoring unit 8. In one embodiment, the sensor monitoring unit 8 is associated with a power source and power and signal cables 10, which operably interconnect each first sensor 2 and each second sensor 4 to the sensor monitoring unit 8. The sensor monitoring unit 8 may include digital signal processors or other devices for data storage, transfer, timing and communication of the sensors to the sensor monitoring unit 8.

The sensor monitoring unit 8 may also be in communication with a central processing unit 12. In one embodiment, information from the sensor monitoring unit 8 is communicated to the central processing unit 12 and stored. Communication software and/or data assessment software may be installed on the sensor monitoring unit 8 and/or the central processing unit 12. Communications to the central processing unit 12 may be further processed and/or stored permanently or temporarily on the central processing unit 12. Communications may also be relayed or transferred to a remote location.

The central processing unit 12 may optionally be interconnected to a number of peripheral devices including, without limitation, a visual display unit 14, a keyboard (or mouse or touch screen), a printer, and/or other suitable peripheral devices for displaying data or calculations or providing input of commands, signals, etc. The sensor monitoring unit 8, central processing unit 12, visual display unit 14 and any peripheral devices may be located together or separately at any suitable location or locations and comprise any suitable computer configuration.

Each first sensor 2, second sensor 4, sensor monitoring unit 8, central processing unit 12, and visual display unit 14, and any peripheral devices may communicate by any number of conventional communication paths. For example, but not intended to limit the scope of the invention, communication paths could be a hardwire communication link such as signal cable and/or a wireless path such as a radio link, cellular path, and/or satellite link.

Each first sensor 2 and each second sensor 4 may be any suitable design capable of sensing the passing or proximity of a moving object along a railway 6. Specifically, in one embodiment of the present invention, each first sensor 2 and each second sensor 4 are environmentally rugged proximity sensors and are preferably proximity sensors such as the inductive proximity sensor manufactured by Telemecanique of France and sold under model no.XS8-C40PC400. In addition, many different types of sensors may be utilized in connection with the present invention including, without limitation, optical sensors, displacement sensors, etc. Because of the numerous limitations of strain gages discussed above, however, it is to be expressly understood that strain gages are not utilized under the teachings of the present invention.

Referring now to FIG. 1 through FIG. 4, in one embodiment, each first sensor 2 is adapted for interconnection to a first rail 16 and each second sensor 4 is adapted for interconnection to a second rail 18. In one embodiment, each first sensor 2 and each second sensor 4 are interconnected to a first rail 16 and a second rail 18, respectively, and each first sensor 2 and second sensor 4 are disposed independently of other first sensors 2 and second sensors 4 along a common imaginary line 20 generally perpendicular to the longitudinal axis of a rail. In one embodiment, each first sensor 2 and each second sensor 4 are interconnected to a first rail 16 and a second rail 18, respectively, and each first sensor 2 and each second sensor 4 are located independently of other first sensors 2 and second sensors 4 along a common imaginary line 20 generally perpendicular to a tangent of a rail. Preferably, each imaginary line 20 common to each first sensor 2 and each second sensor 4 extends from center of each first sensor 2 to center of each second sensor 4. Any number of first sensors 2 and second sensors 4 may be used and the teachings of the present invention are not limited to that shown in FIG. 1.

Each first sensor 2 and each second sensor 4 may be located anywhere along the railway 6. For example, any and all first sensors 2 and/or second sensors 4 may be located above a sleeper 24 or between sleepers 24. In one embodiment, however, each first sensor 2 is paired with a second sensor 4 and located at predetermined distances or intervals along a section of railway 6. In one embodiment, the predetermined distances and intervals are determined after consideration of the diameter of wheels of a wheelset, the distance between axles of each wheelset, and the distance between centers of each railroad vehicle truck (which consists of two or more wheelsets).

Figures 3, 4:
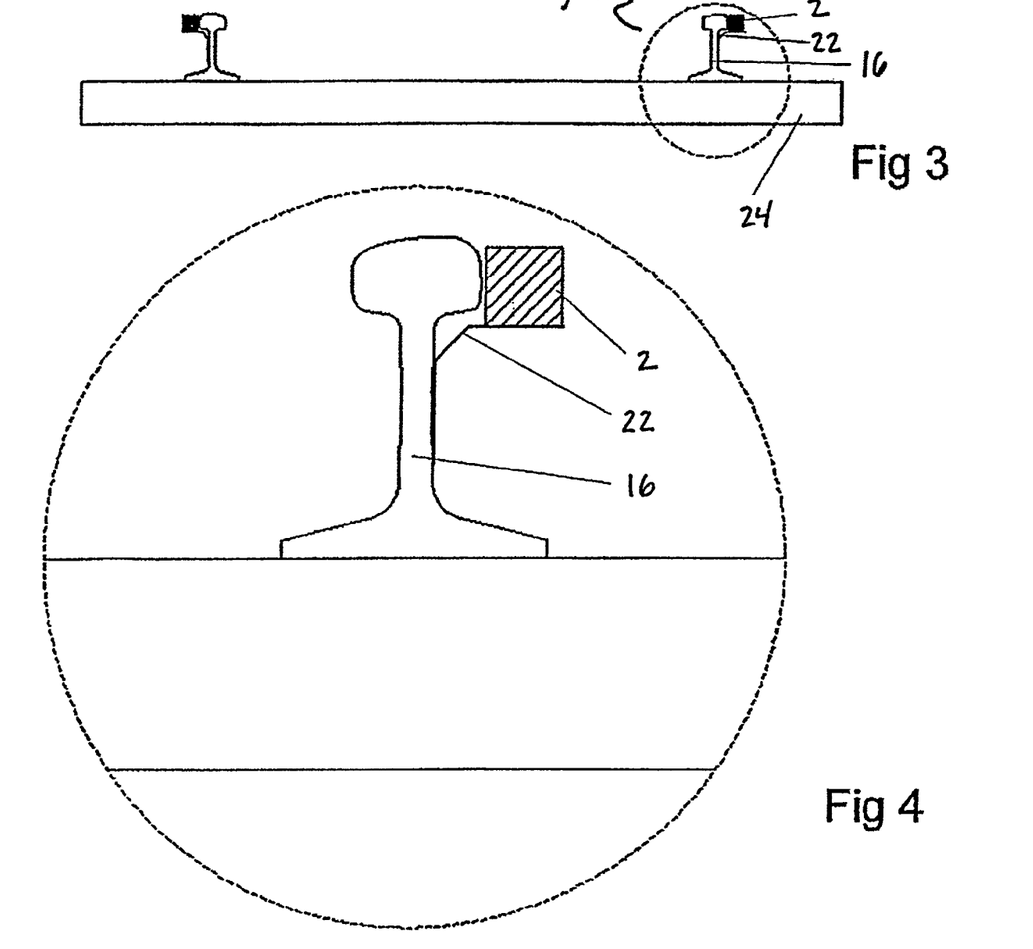
FIG. 3 is a front elevation view of a cross section of railroad track illustrating the interconnection of sensors to the rails in accordance with the invention.
FIG. 4 is a detailed view taken from FIG. 3 illustrating the interconnection of a sensor to a rail.
Figure 5:
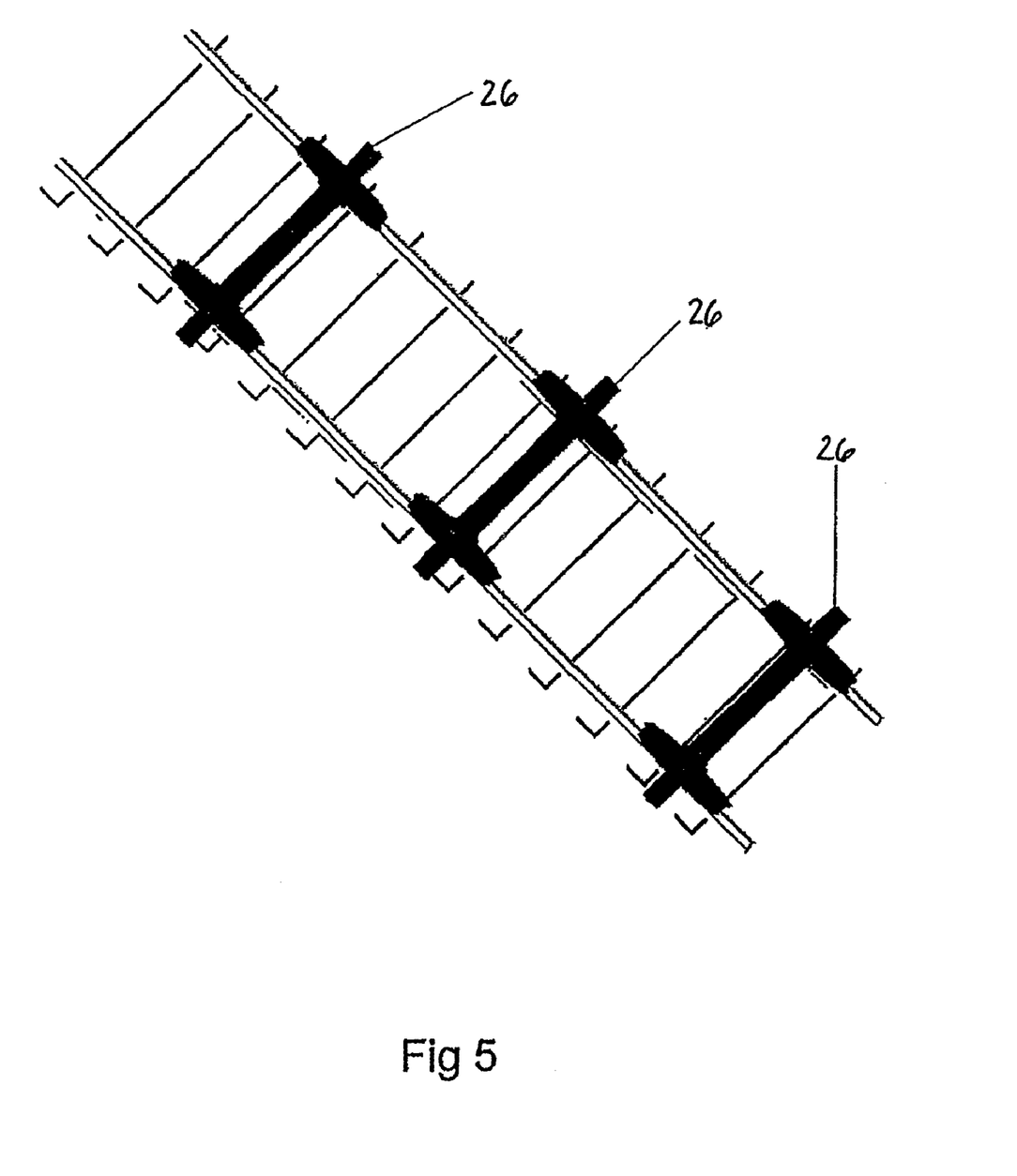
FIG. 5 is a top plan view of wheelsets located along a section of track with perfect lateral and longitudinal position on the track.

Referring now to FIG. 3 and FIG. 4, in one embodiment, each first sensor 2 is connected to an individual mounting bracket 22 that is connected to the first rail 16 and each second sensor is connected to an individual mounting bracket that is connected to the second rail. In one embodiment, the first sensors 2 and the second sensors may adapted for interconnection to the outside (i.e. field side) or inside (i.e. track side) of the rails. Further, any sensors may be located in relation to the rails such that the sensors may scan the backface of a wheel rim of a railway vehicle wheel. In one embodiment, the present invention employs a device for compensating, adjusting and/or measuring any differential movement of the rails resulting from differential temperatures and mechanical forces relative to each rail.

Referring now to FIG. 1 through FIG. 9, in operation, each first sensor 2 and each second sensor 4 may be activated as a wheel of wheelset 26 is located in proximity to each first sensor 2 and each second sensor 4. The length of time any sensor is activated may depend upon the speed of travel of the wheelset 26, the diameter of the wheels on the wheelset 26, and the proportion of each wheel that is directly passing by the sensor. In one embodiment, the sensor monitoring unit 8 may monitor and record when each sensor is activated and the length of time each sensor remains activated.

Figure 6:
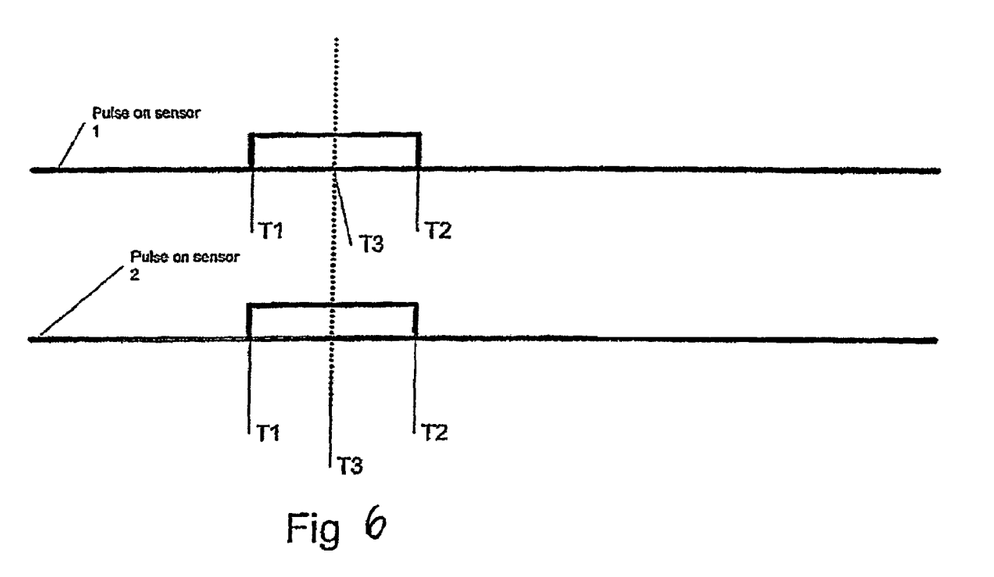
FIG. 6 depicts the pulse of each sensor of a sensor pair for a wheelset with perfect lateral and longitudinal position on a railroad track.
Figure 7:
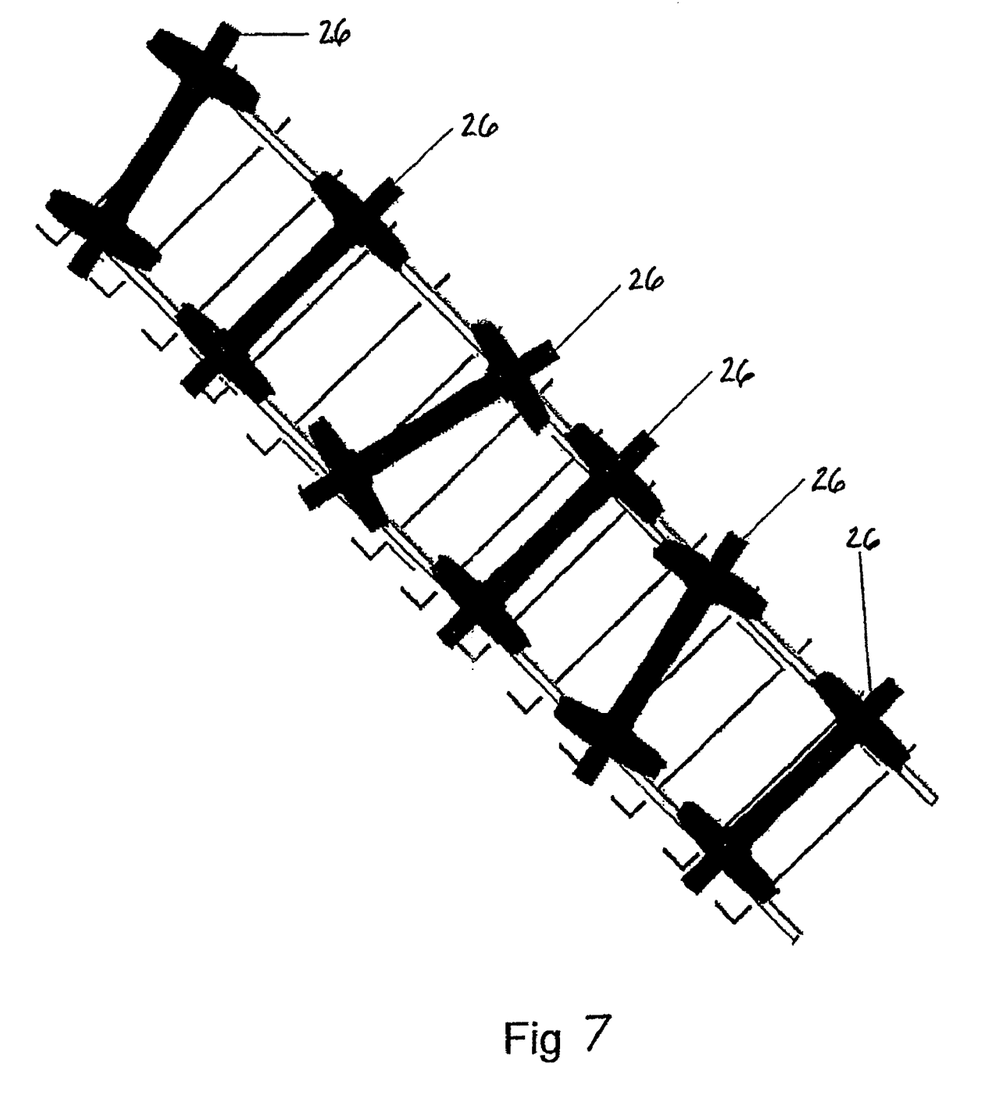
FIG. 7 is a top plan view of wheelsets located along a section of track wherein some of the wheelsets are hunting.
Figure 8:
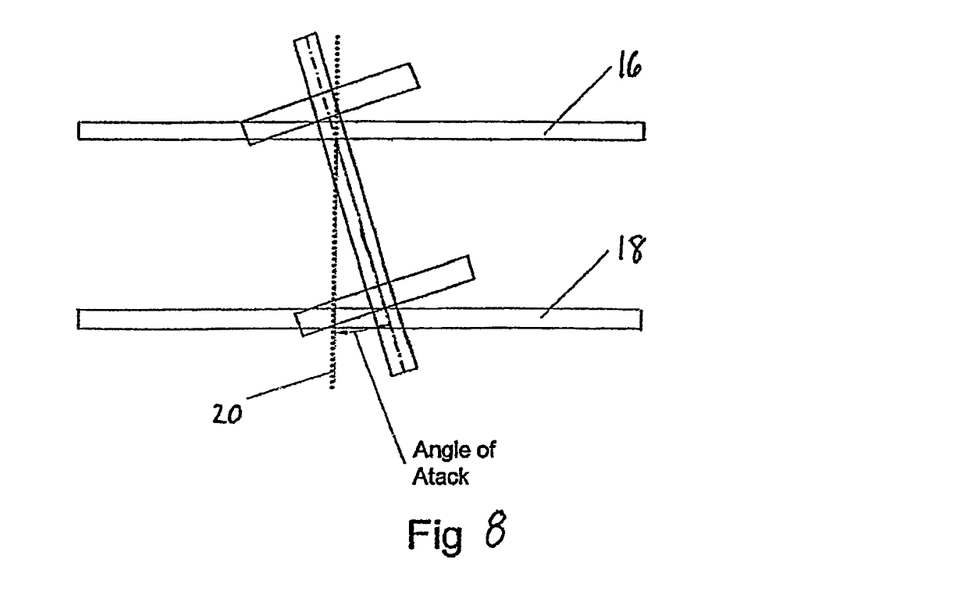
FIG. 8 is a top plan view of a wheelset on a section of track having a positive angle of attack.

The angle of attack and the lateral position of a wheelset 26 may be derived from the moment of activation and length of activation of a first sensor 2 and a second sensor 4. In one embodiment, the angle of attack and the lateral position of a wheelset 26 as it passes over a first sensor 2 and second sensor 4 is calculated by comparing the moments of activation of the first sensor 2 and the second sensor 4 and the lengths of time the first sensor 2 and the second sensor 4 are activated. An aligned wheelset 26 with no angle of attack (see FIG. 5) is one where a wheel located to one end of a axle of a wheelset 26 and a wheel located to the other end of the axle of the wheelset 26 are situated on the first rail 16 and the second rail 18, respectively, in substantially the same position, with the same amount of overhang. An example of pulses outputed by a first sensor 2 and a second sensor 4 when an aligned wheelset 26 passes over the first sensor 2 and the second sensor 4 is depicted in FIG. 6.

Figure 9:
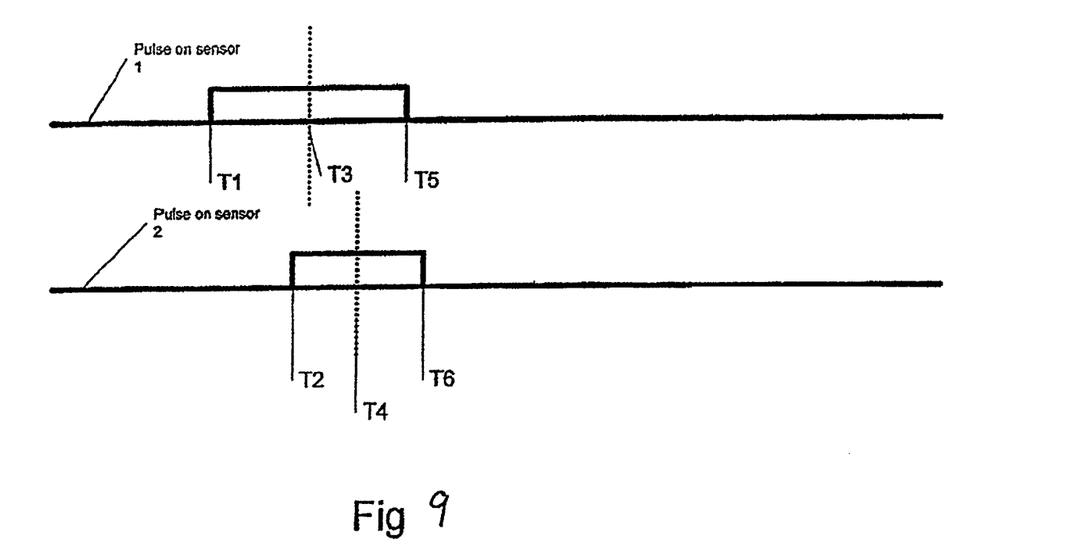
FIG. 9 depicts the pulse of each sensor of a sensor pair for a wheelset that is hunting and/or has a positive angle of attack.

A wheelset 26 with a positive angle of attack (see FIG. 7) is typically one where the wheels are located at an angle in relation to at least one rail. Angle of attack may also be the angle between the axle centerline of a wheelset and a line that is perpendicular to a rail (see FIG. 8) or the angle between a line that is normal to the tangent of a rail and the axle centerline of a wheelset 26 when, for example, a rail vehicle is negotiating a curved section of rail. An example of pulses recorded when a wheelset 26 with a positive angle of attack passes over a sensor pair is depicted in FIG. 9.

In operation, the approximate velocity of a wheelset 26, truck or railway vehicle may also be derived by comparing the activation times of consecutively activated first sensors 2 or second sensors 4 with reference to the known distance along the track between the first sensors 2 or second sensors 4. In addition, the time when the center of a wheel is directly over the center of a sensor may be approximately calculated by adding the time of activation of the sensor to one-half the length of activation of the sensor. The angle of attack of a wheelset 26 may then be determined by calculating the difference in the time when the center of one wheel of a wheelset 26 is directly over a first sensor 2 to the time when the center of the other wheel of a wheelset 26 is directly over a second sensor 4, and multiplying that difference by the estimated velocity of the wheelset, truck or railway vehicle. It is to be expressly understood that other mathematical approaches for estimating angle of attack may be utilized under the teachings of the present invention.

The angle of attack may also be determined at multiple locations along the railway by employing a plurality of first sensors 2 and second sensors 4. Changes of location of a wheelset 26 in relation to a rail may be compared by referencing the activation time and activation duration of each of multiple first sensors 2 and second sensors 4. Indeed, when a wheelset 26 has passed through multiple first sensors 2 and second sensors 4 located on a particular section of railway 6, the angle of attack and lateral position of the wheelset 26 over each sensor may be determined. If the lateral position of the wheelset 26 changes as it passes over each first sensor 2 or second sensor 4, a hunting wheelset 26 condition may be indicated. In addition, the greater the change in angle of attack and lateral position of a wheelset 26 between sensors along a rail, the greater the likely severity of hunting. In operation, if two wheelsets 26 on the same truck are hunting, then a hunting truck has been detected, and if two or more trucks on a railway vehicle are hunting, a hunting vehicle has been detected.

Figure 10:
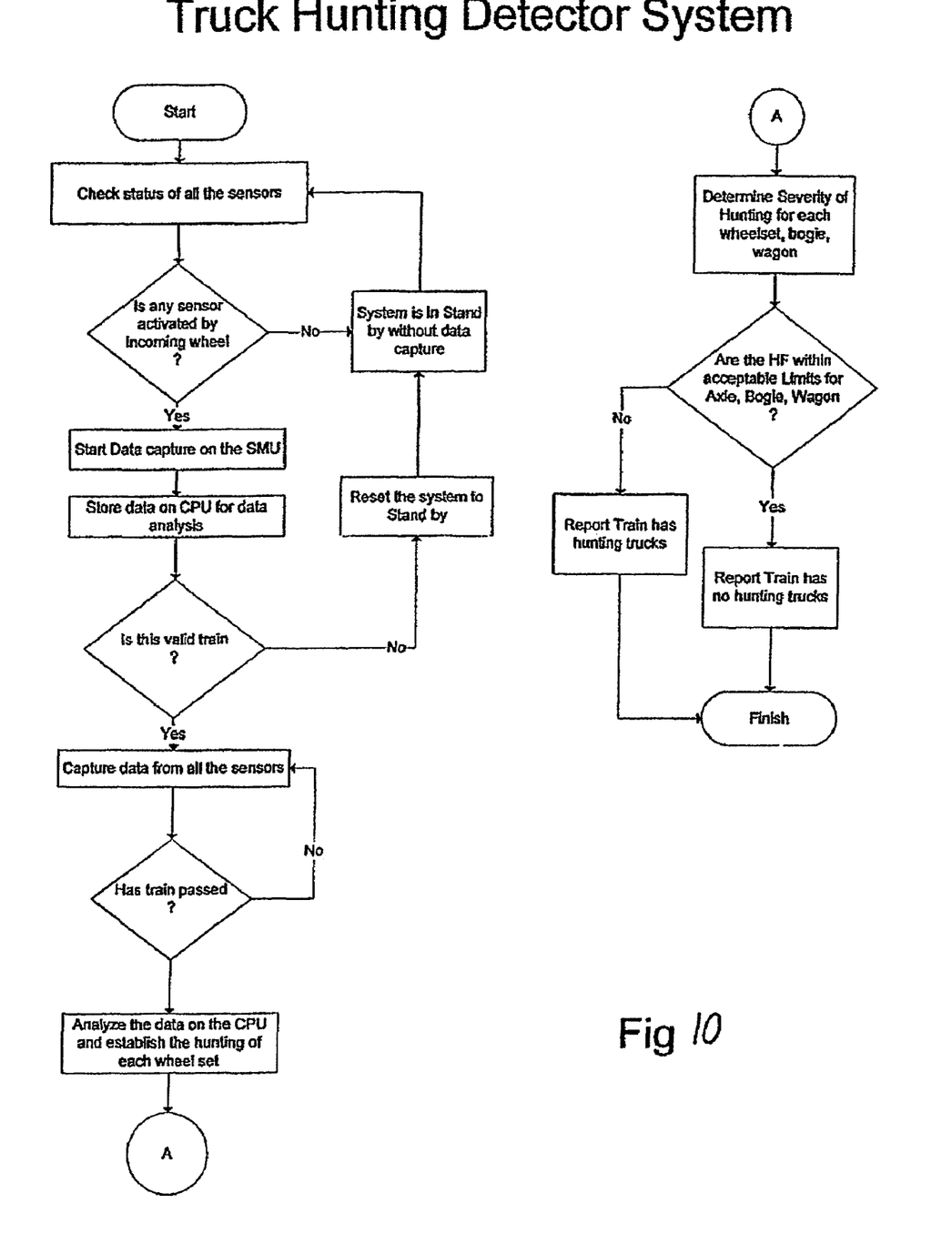
FIG. 10 is a flow diagram illustrating the operation of the truck hunting detection system.

In FIG. 10, the method of determining the angle of attack and detecting hunting, in one embodiment, is set forth. In operation, a sensor monitoring unit may capture data communicated by sensors activated by a wheel and that data may be stored on the computer processing unit for analysis. In one embodiment, the data captured on the sensor monitoring unit is the moment and length of activation of each activated sensor. Once data is captured from at least one sensor activated by passing wheels, the data may be analyzed on the computer processing unit to determine whether any wheelsets are hunting and the severity of any hunting. The calculated severity of the hunting may then be compared to preset acceptable limits to determine whether a wheelset, truck, or railway vehicle is hunting. If the calculated hunting severity is within acceptable limits, no hunting may be reported. If the calculated hunting severity is outside acceptable limits, a hunting condition may be reported so that corrective action such as maintenance or repair may be taken.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A detection system comprising:
   first sensing means, located adjacent a first rail of a railway, for detecting and communicating proximity along the first rail of a first wheel of a wheelset; and
   second sensing means, located adjacent a second rail of the railway, for detecting and communicating proximity along the second rail of a second wheel of the wheelset;
   wherein the first sensing means and the second sensing means are disposed along a common line generally perpendicular to at least one of a longitudinal axis of at least one of the first rail and the second rail and a tangent of at least one of the first rail and the second rail;
   wherein the first sensing means and the second sensing means are not strain gages; and
   wherein the first sensing means and the second sensing means are in communication with means for monitoring the first sensing means and the second sensing means;
   wherein data is produced by the first sensing means and data is produced by the second sensing means; and
   processing means wherein at least a portion of the data produced by the first sensing means and the second sensing means is utilized by the processing means to obtain at least one of a hunting condition, lateral position of the wheelset and an angle of attack.

2. A detection system comprising:
   first sensing means, located adjacent a first rail of a railway, for detecting and communicating proximity along the first rail of a first wheel of a wheelset; and
   second sensing means, located adjacent a second rail of the railway, for detecting and communicating proximity along the second rail of a second wheel of the wheelset;
   wherein the first sensing means and the second sensing means are disposed along a common line generally perpendicular to at least one of a longitudinal axis of at least one of the first rail and the second rail and a tangent of at least one of the first rail and the second rail;
   wherein the first sensing means and the second sensing means are not strain gages;
   wherein the first sensing means and the second sensing means are in communication with means for monitoring the first sensing means and the second sensing means; and means, in communication with at least one of the first sensing means, the second sensing means and the means for monitoring the first sensing means and the second sensing means, for processing output of at least one of the first sensing means and second sensing means.

3. A detection system comprising:

first sensing means, located adjacent a first rail of a railway, for detecting and communicating proximity along the first rail of a first wheel of a wheelset; and second sensing means, located adjacent a second rail of the railway, for detecting and communicating proximity along the second rail of a second wheel of the wheelset;

wherein the first sensing means and the second sensing means are disposed along a common line generally perpendicular to at least one of a longitudinal axis of at least one of the first rail and the second rail and a tangent of at least one of the first rail and the second rail;

wherein the first sensing means and the second sensing means are not strain gages;

wherein the first sensing means and the second sensing means are in communication with means for monitoring the first sensing means and the second sensing means; and means, in communication with at least one of the first sensing means, the second sensing means and the means for monitoring the first sensing means and the second sensing means, for analyzing reports of at least one of the first sensing means, the second sensing means and the means for monitoring the first sensing means and the second sensing means.

* * * * *